US007571023B2

(12) United States Patent
Mitchell et al.

(10) Patent No.: US 7,571,023 B2
(45) **Date of Patent: *Aug. 4, 2009**

(54) PHARMACEUTICAL SINGULATION COUNTING AND DISPENSING SYSTEM

(75) Inventors: Barton Carter Mitchell, Pauline, SC (US); Jerriel Keith Greene, Simpsonville, SC (US); Darol Blake Foster, Moore, SC (US); Michael Wayne Davis, Simpsonville, SC (US)

(73) Assignee: JM Smith Corporation, Spartanburg, SC (US)

( * ) Notice: Subject to any disclaimer, the term of this patent is extended or adjusted under 35 U.S.C. 154(b) by 86 days.

This patent is subject to a terminal disclaimer.

(21) Appl. No.: 11/786,553

(22) Filed: Apr. 12, 2007

(65) Prior Publication Data

US 2008/0255700 A1 Oct. 16, 2008

(51) Int. Cl.
*G06F 17/00* (2006.01)

(52) U.S. Cl. ....................... 700/236; 700/231; 700/232; 700/240; 700/243; 221/200

(58) Field of Classification Search ......... 700/231–244; 221/200
See application file for complete search history.

(56) References Cited

U.S. PATENT DOCUMENTS

| | | | | |
|---|---|---|---|---|
| 1,502,053 A | | 7/1924 | Nordstrom | |
| 2,389,496 A | | 11/1945 | Gagnon et al. | 198/32 |
| 2,523,517 A | | 9/1950 | Potter | 235/98 |
| 2,742,184 A | | 4/1956 | Yerkes et al. | 221/203 |
| 2,941,652 A | | 6/1960 | Miller | 198/30 |
| 3,357,536 A | | 12/1967 | Kelly | 198/30 |
| 3,376,970 A | | 4/1968 | Roseberg | 198/40 |
| 3,490,574 A | | 1/1970 | Taylor et al. | 198/30 |
| 3,669,260 A | | 6/1972 | Hoppmann et al. | 209/73 |
| 3,677,437 A | | 7/1972 | Haigler | 221/7 |
| 3,722,674 A | | 3/1973 | Hoppmann et al. | 209/73 |
| 3,722,740 A | | 3/1973 | List | 221/7 |
| 3,746,211 A | | 7/1973 | Burgess, Jr. | 221/7 |
| 3,837,139 A | * | 9/1974 | Roseberg | 53/501 |
| 3,978,641 A | | 9/1976 | Tollefsbol | 53/53 |
| 4,000,807 A | * | 1/1977 | Molique | 198/443 |
| 4,013,192 A | | 3/1977 | Pillon | 221/7 |
| 4,379,504 A | | 4/1983 | Salicini | 198/455 |
| 4,382,527 A | | 5/1983 | Lemer | 222/56 |
| 5,369,940 A | * | 12/1994 | Soloman | 53/501 |
| 5,638,417 A | | 6/1997 | Boyer et al. | 377/7 |
| 5,671,262 A | | 9/1997 | Boyer et al. | 377/11 |

(Continued)

OTHER PUBLICATIONS

PCT International Search Report—PCT/US2008/04369; Jul. 2, 2008; Young, Lee W.

*Primary Examiner*—Gene Crawford
*Assistant Examiner*—Michael K Collins
(74) *Attorney, Agent, or Firm*—Timothy J. Monohan; Monahan & Moses, LLC

(57) ABSTRACT

An apparatus for counting pharmaceutical units is provided having a supporting deck assembly, a hopper, a cylindrical chamber and a transport ring positioned between the hopper and the cylindrical chamber, wherein the hopper has a tilted floor, which can be shaken or vibrated to discharge the units on to a transport ring, and the transport ring is sloped downward from its inner to outer perimeter, which brings the units into contact with the undulating surface of the walls of the cylindrical chamber to promote singulation prior to counting.

20 Claims, 10 Drawing Sheets

U.S. PATENT DOCUMENTS

| | | | | |
|---|---|---|---|---|
| 5,720,154 | A | 2/1998 | Lasher et al. | 53/411 |
| 5,804,772 | A * | 9/1998 | Wooldridge et al. | 177/116 |
| 5,884,806 | A | 3/1999 | Boyer et al. | 221/75 |
| 5,927,546 | A | 7/1999 | Yuyama et al. | 221/265 |
| 6,053,302 | A | 4/2000 | Leu et al. | 198/471.1 |
| 6,085,938 | A | 7/2000 | Coughlin | 221/203 |
| 6,208,911 | B1 | 3/2001 | Yamaoka et al. | 700/242 |
| 6,377,648 | B1 | 4/2002 | Culbert | 377/6 |
| 6,421,584 | B1 | 7/2002 | Norberg et al. | 700/242 |
| 6,578,733 | B2 * | 6/2003 | Geltser et al. | 221/200 |
| 6,592,005 | B1 | 7/2003 | Coughlin et al. | 221/129 |
| 6,681,149 | B2 | 1/2004 | William et al. | 700/231 |
| 6,471,093 | B1 | 10/2004 | Kodama | 221/266 |
| 7,014,063 | B2 | 3/2006 | Shows et al. | 221/211 |
| 7,412,302 | B2 * | 8/2008 | Cobb et al. | 700/243 |
| 2003/0024943 | A1 | 2/2003 | MacDonald | 221/92 |
| 2006/0225383 | A1 | 10/2006 | Cobb | 53/449 |

* cited by examiner

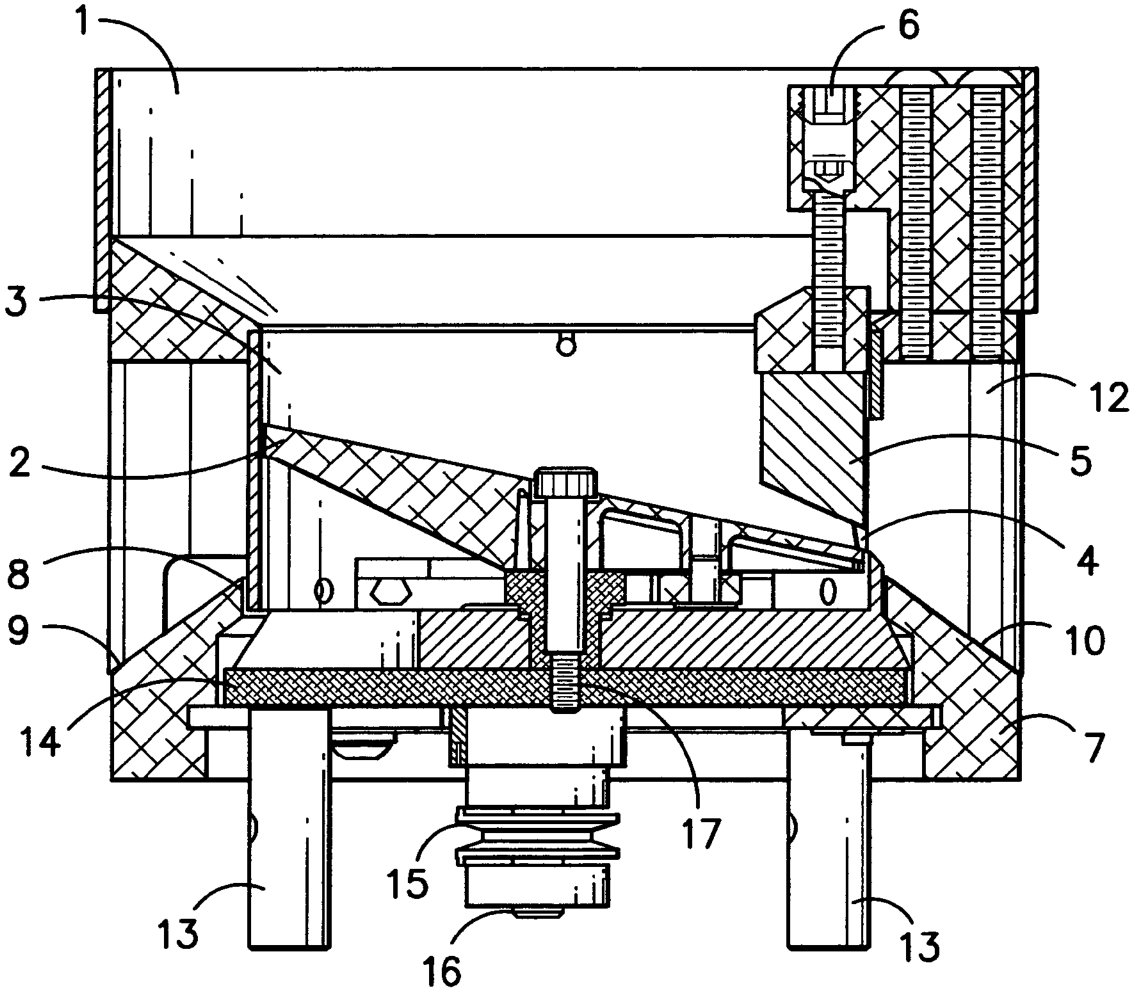
FIG. –3–

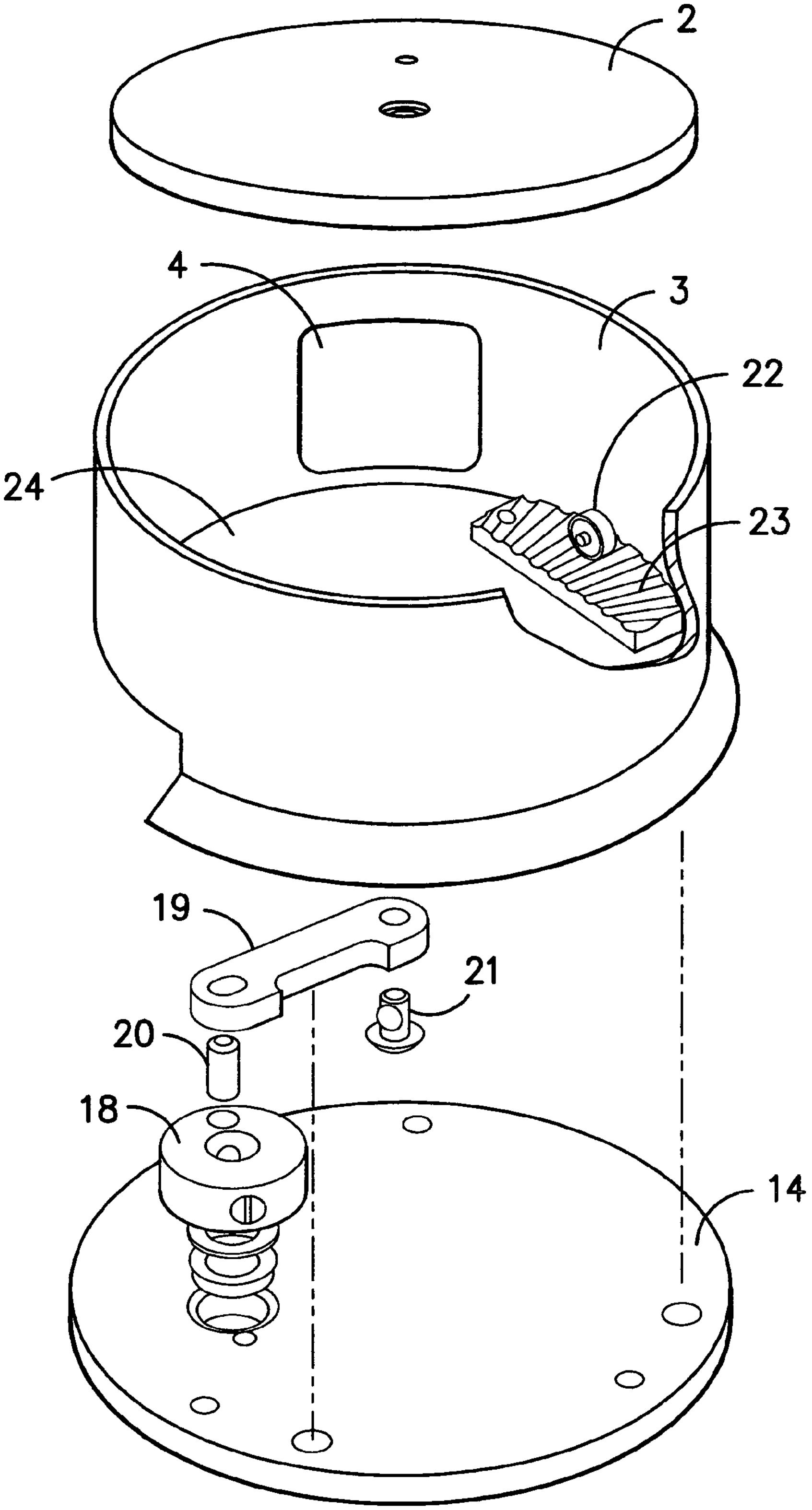
FIG. −4−

PHARMACEUTICAL SINGULATION COUNTING AND DISPENSING SYSTEM

BACKGROUND OF THE INVENTION

This invention relates to the field of automated pharmaceutical unit singulation, counting and dispensing. In particular, the present invention relates to an apparatus for pharmaceutical unit singulation, counting and dispensing, as well as a system of controlling individual and groups of apparatus.

Automated systems for pharmaceutical singulation, counting and dispensing are known in the art, and each attempt to solve a deceptively complicated task, namely the automated reduction of pharmaceutical units from bulk storage into an easily countable line of pharmaceutical units. Previous systems, however, are quite large and expensive, making them difficult to retrofit into an existing community pharmacy, chain pharmacy, or institutional pharmacy designed and built when the pharmacist hand counted each and every prescription.

Previous systems further remain challenged to accurately count pharmaceutical units and avoid damaging or destroying pharmaceutical units in the process.

Thus, there remains a need for the improvement of automated systems for pharmaceutical singulation, counting and dispensing.

SUMMARY OF THE INVENTION

The apparatus of the present invention performs several functions, which may be referred to as singulation, counting and dispensing. Singulation is the process by which pharmaceutical units are supplied in bulk to the apparatus and, by various material handling and conveying processes, separated for counting. Typically, the units are placed in single file and presented to a counter.

The counter contains a sensor for detecting a pill as it passes. The counter may be a combination IR emitter/LED/IR phototransmitter, photocell or other electronic sensing device. The counted units are accumulated in a receptacle, from which they are dispensed, for example, by being directed into a vial of the type commonly used for consumers prescription medication.

The entire system may be automated, that is, the apparatus may be controlled by a computer, which receives prescription data, initiates a count cycle, activates the singulation mechanism, receives a pharmaceutical unit count from the counting system and ends a count cycle.

The present invention also includes a plurality of apparatus, which are linked together by the same computer control system, as well as being physically arranged together in a bank or array of apparatus. It is possible to load such a system with a variety of popular pharmaceutical units, and thereby relieve a pharmacist from many of the tasks associated with filling prescriptions.

An apparatus is provided having a deck assembly, which is the underlying supporting structure for the various components that make up the unit. A hopper is mounted on the deck assembly. A lid on the hopper opens, so that pharmaceutical units, which are supplied in bulk, can be poured in to fill the hopper. The base of the hopper is surrounded by a transport ring, so it is economical use of space for the lower portion of the hopper to be cylindrical, with side walls rising up from the base of the hopper. At a sufficient height above the transport ring to avoid contact with pharmaceutical units, the diameter of the hopper may increase, to maximize storage capacity.

The hopper has a floor positioned within the side walls. The floor is tilted relative to the horizontal, and an opening is provided in the hopper, adjacent the lower side of the floor, from which to discharge the pharmaceutical units onto the transport ring. The tilt of the floor causes the pharmaceutical units to slide toward the opening. The tilt may be from 5 to 45° relative to the horizontal, preferably from 8 to 20°.

The floor of the hopper is free to move, relative to the walls of the hopper. In particular, the floor is free to pivot about an axis, as well as to move upward (vertically) a sufficient distance to allow the floor to be vibrated. Thus, there are several forces employed to urge the pharmaceutical units towards the opening. It can be understood, however, that the objective is to feed the pharmaceutical units to the opening in the hopper at a steady rate, without overwhelming the ability of the apparatus to singulate the units.

The apparatus is provided with means to pivot the floor of the hopper about an axis. The axis may be efficiently located in the center of the base of the hopper, that is centrally located relative the sides of the hopper. By way of example, the floor of the hopper may be connected to an arm, with the arm being mounted on a small wheel at a position eccentric to the axis of the wheel. As the wheel rotates, the arm causes the floor to pivot back and forth. The pivoting action has a two-fold benefit—the lower side of the floor sweeps back and forth across the opening in the hopper, thereby urging the pharmaceutical units outward, and as the direction of the pivot of the floor reverses, the pharmaceutical units are shaken back and forth, which tends to dislodge them. The opening and the degree to which the floor is pivoted may be adjusted to complement each other, that is, the lower side of the floor may remain in communication with the opening, as the floor swings back and forth, thereby ensuring a steady discharge of pharmaceutical units.

The apparatus is also provided with means to vibrate the floor of the hopper. In one embodiment of the invention, the floor of the hopper rides unevenly over a surface as the floor is pivoted back and forth, thereby causing small up and down vibrations, which assist in uniformly discharging the pharmaceutical units from the hopper. For example, the bottom of the floor of the hopper may be fitted with a wheel or other projection, which rides over a ridged surface affixed to the base of the hopper or the deck assembly. The ridged surface produces a "washboard" effect as the wheel rides back and forth, when the floor of the hopper is pivoted. A wide variety of configurations may be employed to create a ridged surface, including sharply angled ridges, square ridges separated by slots, undulations, waves, ribs, etc. The ridged surface may be incorporated into a molded part, or a small piece of material having the desired ridged structure may be separately affixed at the desired location.

Alternatively, the ridged surface may be on the underside of the floor of the hopper and positioned to ride over a wheel or other projection mounted on the deck or the base of the hopper assembly. The desired effect will be substantially the same as when the wheel is mounted on the bottom of the floor, that is, the floor of the hopper will be vibrated as it rides unevenly across the surface.

The apparatus is provided with means to support the floor of the hopper in a tilted orientation, while allowing the hopper to pivot. For example, the floor of the hopper may be mounted on a shaft extending upward from the deck assembly, and centrally positioned in the hopper. In addition to allowing the floor of the hopper to pivot, the means to support the hopper can be designed to maintain contact between the components of the means to vibrate the hopper, for example, by urging a wheel mounted on the floor of the hopper against a ridged surface, to create the desired vibrations.

The rate at which pharmaceutical units are discharged from the outlet of the hopper is also controlled by a gate. The gate may be adjusted so that it covers more or less of the outlet. For example, the gate may be raised or lowered to increase or decrease the rate at which pharmaceutical units are discharged, respectively.

In one embodiment, the flow of pharmaceutical units from the hopper is regulated by a means to dislodge pharmaceutical units that are stacked on top of each other. For example, a plurality of flexible fingers, depending downward and partially restricting the outlet of the hopper, may be provided. The means to dislodge the stacked units may be raised or lowered, as necessary, to minimize the stacking of units. The flexible fingers also serve as a type of gate to control the rate at which the pharmaceutical units are discharged. Examples of suitable flexible fingers include bristles and fibers.

The flexible fingers may be arranged in one row or in an array of rows extending backward from the opening. In one example, the means to reduce the pharmaceutical units to a single layer as they are discharged is to provide an array of flexible fingers that have a depth of at least ¼ inch, preferably at least ½ inch, as measured perpendicular to the opening. In one embodiment, the flexible fingers are farther away from the floor of the hopper, as one moves farther away from the opening. Thus, the array of fingers creates a wedge shaped space. As the pharmaceutical units slide down the floor of the hopper towards the opening they encounter the back of the array of flexible fingers, which provides greater resistance by virtue of the fingers being supported by the fingers closer to the outlet of the hopper. As the pharmaceutical units slide closer to the outlet, the distance between the floor of the hopper and the bottom of the fingers narrows, thereby restricting pharmaceutical units that are stacked on other units from passing. Finally, as the pharmaceutical units slide down to the outlet, the distance between the bottom of the flexible fingers and the floor of the hopper is less than the thickness of two pharmaceutical units stacked on top of each other. Further, the fingers closed to the outlet provide less resistance to the flow of pharmaceutical units, since the fingers flex more readily without supporting fingers behind them.

The aforementioned wedge of flexible fingers may be at an angle of from 20° to 45° relative to the horizontal, as measured at the bottom of the fingers. The angle of the wedge is preferably greater than the angle of tilt of the floor, to gradually restrict the height of pharmaceutical units that can slide past.

A rotatable transport ring is carried by the deck assemble, for transporting the pharmaceutical units from the outlet of the hopper to a receptacle. A counting unit is interposed between the transport ring and the receptacle. The counting unit generates a signal, which is used by the controller for determining when the desired quantity of pharmaceutical units have been discharged into the receptacle.

The transport ring may be characterized by an inner perimeter, outer perimeter and a top surface. The opening in the hopper is positioned to discharge pharmaceutical units on to the top surface of the transport ring. For economical use of space, the hopper is positioned on the deck assembly within the inner perimeter of the transport ring.

The transport ring rotates as the pharmaceutical units are discharged, which functions to singulate the units, that is, to cause the units to line up in single file. The operation of the transport ring is managed by the controller. Thus, the controller starts the transport ring rotating at the beginning of a count cycle and stops the rotation at the end of the cycle. The controller can also speed up, slow down or reverse the ring, for example to dislodge jams of pharmaceutical units.

A cylindrical chamber is carried on the deck assembly and positioned around the outer perimeter of the transport ring. The side walls of the cylindrical chamber create a housing surrounding the transport ring and the hopper, and may be conveniently constructed to minimize dust or other contaminant from being introduced into the system.

In one embodiment of the invention, the transport ring is slanted downward from its inner perimeter to its outer perimeter. The transport ring may be sloped from 15 to 55° relative to the horizontal, preferably from 25 to 45°. The pharmaceutical units are kept from sliding off of the transport ring by positioning the cylindrical chamber in close proximity to the outer perimeter of the transport ring. The sides of the cylindrical chamber may be smooth, or the sides may be shaped to jostle the pharmaceutical units, by presenting an undulating surface.

The pharmaceutical units may arrange themselves on the transport ring two-abreast, that is, side by side, on the transport ring. Or, the pharmaceutical units may be stacked on top of each other on the transport ring. The use of the slanted transport ring in conjunction with a cylindrical chamber having sides with an undulating surface has been found to be especially useful in promoting singulation of the pharmaceutical units.

The object of presenting an undulating surface to the pharmaceutical units as they are carried along on the transport ring is to alternately force the units up and allow them to drop down the slope of the transport ring. In other words, the undulating surface pushes the pharmaceutical unit toward the center of the ring, when the units pass a "crest" on the side of the cylinder and allows the unit to slide down away from the center, when the unit passes a "trough." As the pharmaceutical units are jostled, they tend to settle against the walls of the cylinder in single file.

Various configurations may be employed to accomplish the stated objectives of the undulating surface. By way of example, the sides of the cylindrical chamber presented to the outer perimeter of the transport ring may be scalloped, rippled, sinusoidal or wavy. The term "undulating" is also intended to include configurations that may have more sharply angled projections, such as teeth, provided that the pharmaceutical units can readily slide by the surface, without becoming engaged or trapped.

The undulating surface of the cylinder wall may be characterized by a distance between crests (frequency) and a distance from the top of a crest to the bottom of a trough (amplitude). By way of example, surfaces having crests of from ⅛ inch to 1½ inches and amplitudes of from 5 mils to 200 mils may be employed, preferably having crests from ¼ inch to ¾ inch and troughs from 20 mils to 100 mils.

The transport ring is driven by a motor. In one embodiment, the motor drives a wheel having a rubber ring around its outer perimeter, which is in contact with and rotates the transport ring. The same motor may also be employed to drive the mechanism for pivoting the floor hopper back and forth. For example, the small wheel connected to the floor of the hopper by an arm may be driven by the motor using a belt and pulley system.

The pharmaceutical units are singulated on the transport ring and discharged into a receptacle. As the units pass from the ring to the receptacle they pass through a counter. A small obstacle may be interposed between the outlet from the transport ring and the receptacle. As the pharmaceutical units are conveyed along the transport ring they must be forced up and around the obstacle before falling down a chute into the receptacle. The obstacle functions to prevent a pharmaceutical unit, which might otherwise be teetering on the edge of the outlet, from falling down the chute to the receptacle, after the transport ring is stopped. The obstacle may be something as simple as a vertical rod, spaced a short distance from the wall of the cylinder, which the pharmaceutical unit must be pushed around.

A controller is provided for receiving prescription data, initiating a count cycle, controlling the transport ring motor, receiving a pharmaceutical unit count from the counting system and ending a count cycle.

An advantage of the present invention is the optimization of space. Thus, it is possible to store a large volume of pharmaceutical units in the hopper, relative to the overall volume occupied by the singulation and counting mechanisms.

BRIEF DESCRIPTION OF THE DRAWINGS

FIG. 3 is a cross-sectional view along line A-A of FIG. 2.

FIG. 4 is an exploded view of the mechanism for pivoting and vibrating the floor of the hopper.

DETAILED DESCRIPTION OF THE INVENTION

Without limiting the scope of the invention, the preferred embodiments and features are hereinafter set forth. All of the United States patents, which are cited in the specification, are hereby incorporated by reference.

Pharmaceutical unit: a caplet, capsule, pill or tablet for the oral or rectal delivery of a drug, vitamin or mineral product.

The present invention relates to an automated system for pharmaceutical singulation, counting and dispensing, whereby a bulk of stored pharmaceutical units are singulated into a single file line for counting and dispensing.

Figure 1:
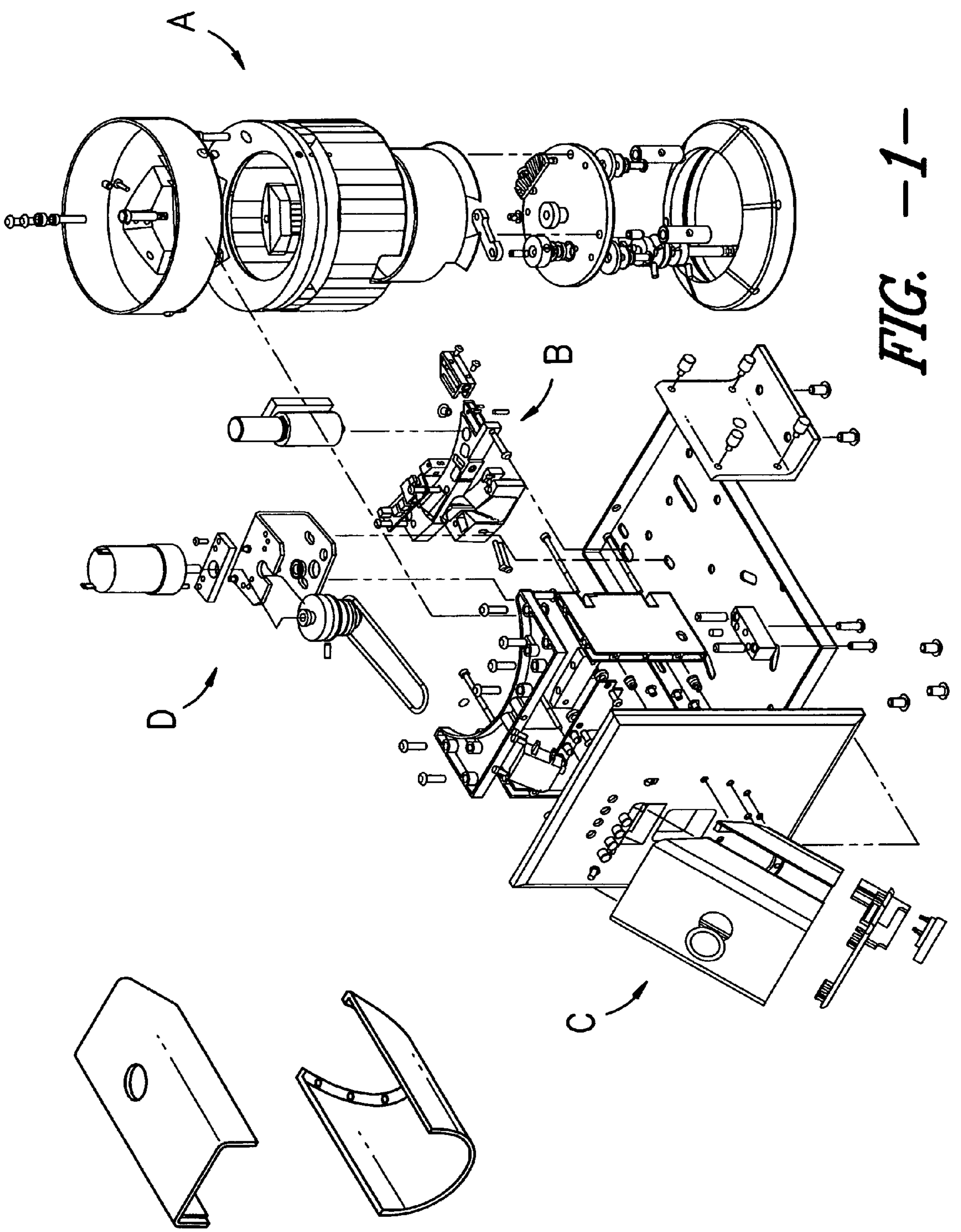
FIG. 1 is an exploded view of the pharmaceutical unit counter and dispensing system.

Referring to FIG. 1, the main components of the apparatus are identified in the exploded view. The components are the singulation assembly A, counter B, receptacle C, and motor assembly D.

Figure 2:
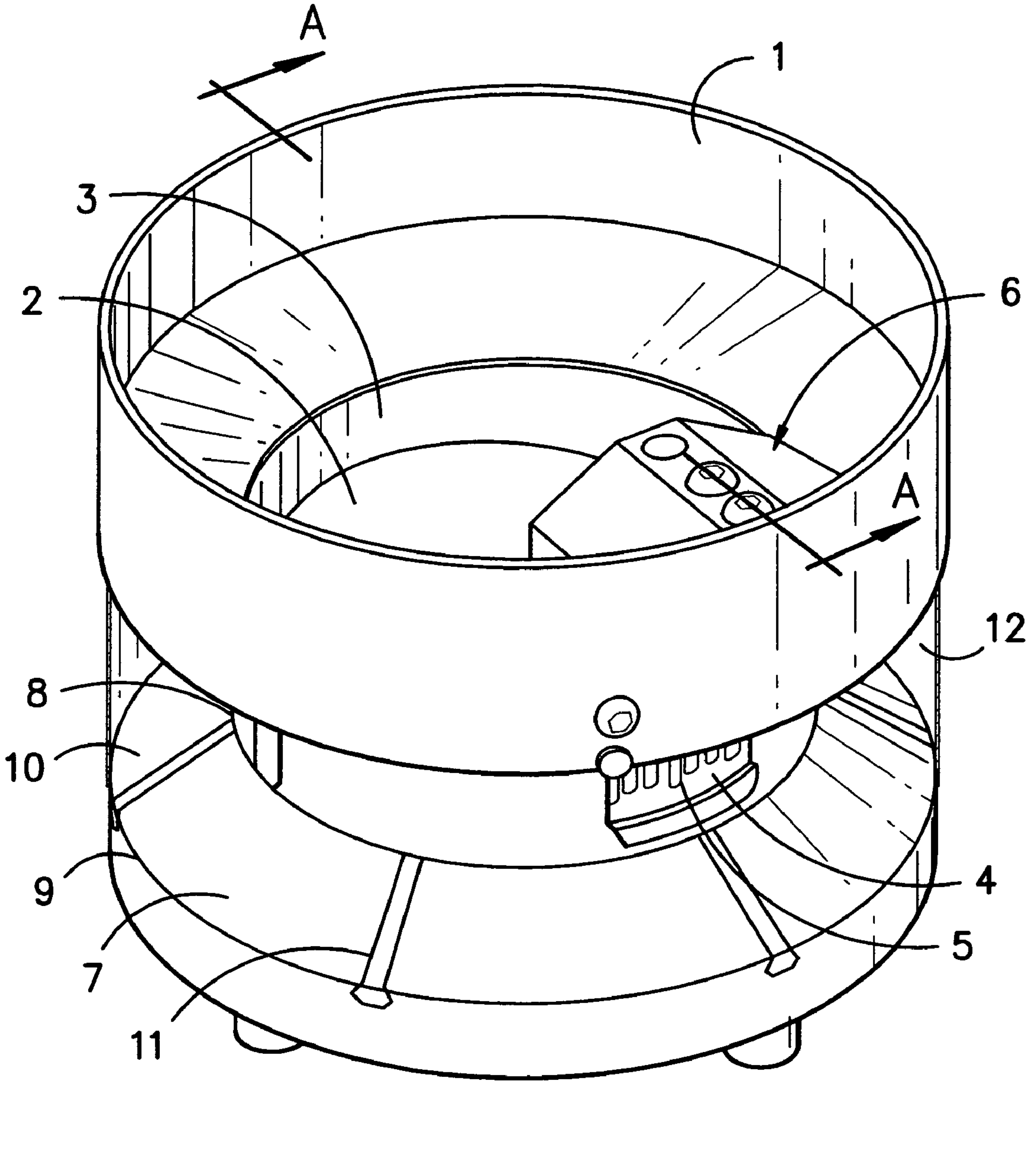
FIG. 2 is a perspective view of the hopper, with the cylindrical changer cut-away to show the transport ring.

Referring to FIG. 2, hopper 1 has floor 2 and side walls 3. Opening 4 is positioned at the lower end of floor 2. Flexible fingers 5 depend from adjusting mechanism 6, and regulate the flow of pharmaceutical units (not shown) on to transport ring 7. Transport ring 7 has inner perimeter 8, outer perimeter 9 and top surface 10. Transport ring 7 has ridges 11 spaced along its surface to facilitate movement of the pharmaceutical units. Cylindrical chamber 12 is shown cut-away; it surrounds transport ring 7, however.

FIG. 3 is a cross-sectional view along lines A-A of FIG. 2. Pillars 13 support deck assembly 14. Pulley 15 is mounted on shaft 16, and connected to a belt driven by the motor. Bolt 17 maintains floor 2 in a tilted position, while allowing enough play for floor 2 to vibrate up and down a short distance.

Referring to FIG. 4, wheel 18 is attached to the end of shaft 16 (not shown). Arm 19 is connected to wheel 18 by rod 20 positioned eccentrically in wheel 18. Rivet 21 connects arm 19 to the bottom of floor 2. As wheel 18 rotates, floor 2 is pivoted back and forth. Small wheel 22 is attached to the bottom of floor 2, so as to allow wheel 22 to roll across ridged surface 23, shown as a plate attached to base 24 of hopper 1. Base 24 is supported by deck 14.

Figure 5:
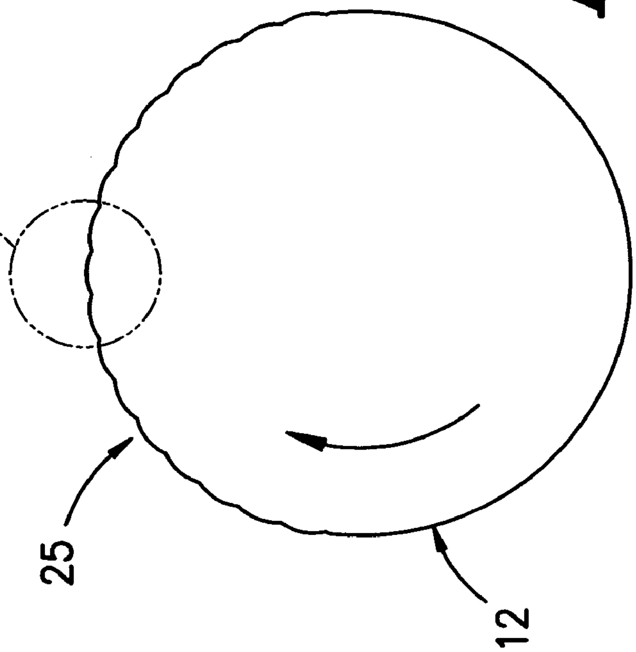
FIG. 5 is a view showing the undulating surface of the cylindrical chamber.

FIG. 5 is a top view of cylindrical chamber 12. An arrow shows the direction the transport ring turns. Since the pharmaceutical units only travel along a portion of the cylindrical chamber 12 before being discharged, it is not necessary to provide the entire circumference of the chamber with an undulating surface. The portion of cylindrical chamber 12 having an undulating surface is designated the agitation zone 25.

Figure 6:
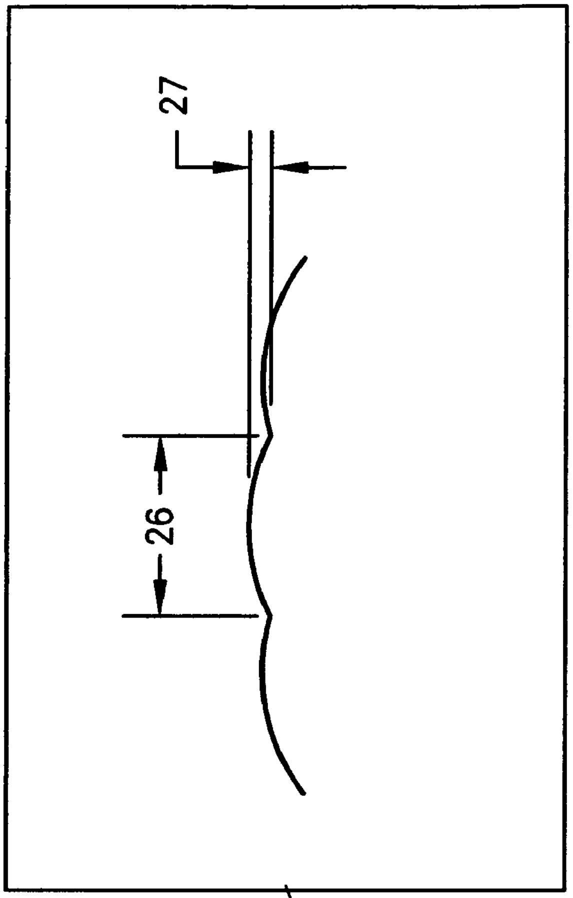
FIG. 6 is a magnified view of the undulating surface.

FIG. 6 is a view of a scallop shaped undulating surface, which may be employed in the walls of cylindrical chamber 12 presented to the outer perimeter of the transport ring. The distance between crests is shown as frequency 26, and the distance from crest to trough is shown as amplitude 27.

Figure 7:
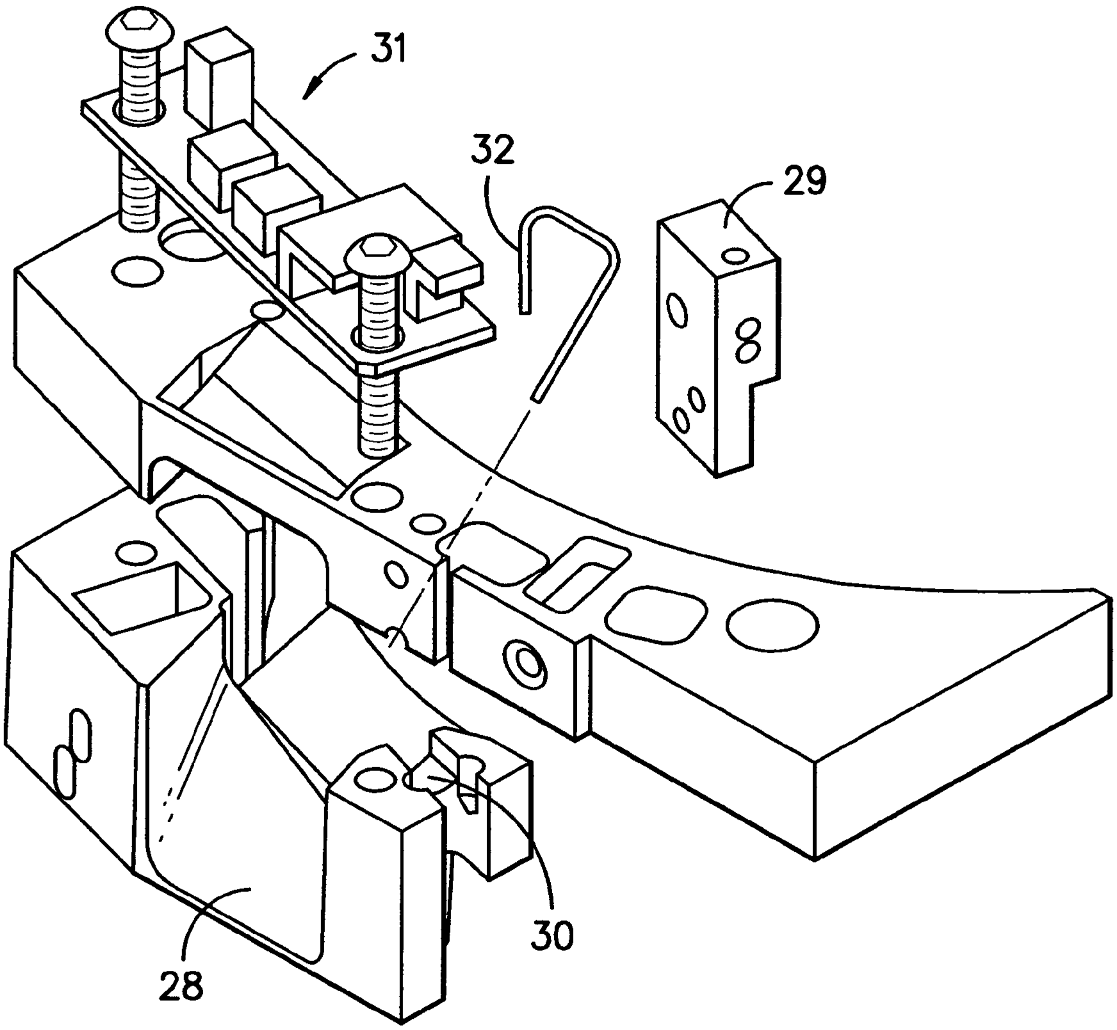
FIG. 7 is an exploded view of the discharge chute, counter and vertical wire rod (obstacle).

Referring to FIG. 7, discharge chute 28 directs the pharmaceutical units from the transport ring to the receptacle. As the units pass through the discharge chute they are counted. Block 29 houses an IR emitter. A sensor is aligned in recess 30 to detect the passing of a unit. Control board 31 controls the counting system and communicates with the controller, for comparison of the units counted with the target value. Wire 32 has a vertical section, which is interposed between the discharge chute and the pharmaceutical units on the transport ring. The wire serves as an obstacle before the pills can reach the discharge chute, i.e. the unit must be forced up and around the wire, before it can drop into the chute, thereby minimizing units dropping after the transport ring stops at the end of a count.

Figure 8:
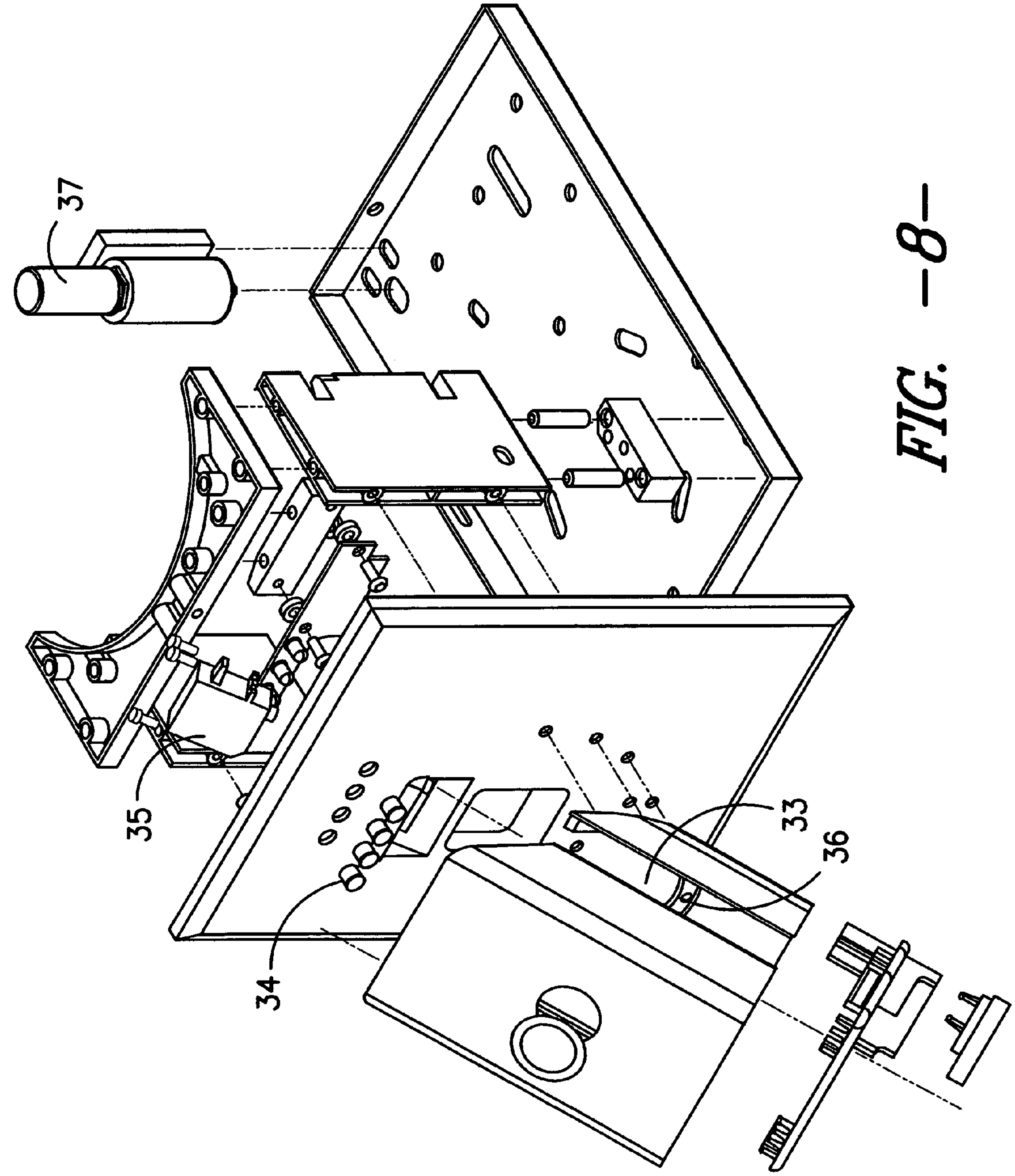
FIG. 8 is an exploded view of the receptacle for storing the pharmaceutical units after they have been counted.

FIG. 8 shows receptacle 33, for receiving the pharmaceutical units from discharge chute 28. Lights 34 are activated to alert the operator as to the status of the counting operation. Servo 35 controls gate 36 at the bottom of receptacle 33. A solenoid 37 prevents bin removal without proper authorization and acts as a security measure.

Figure 9:
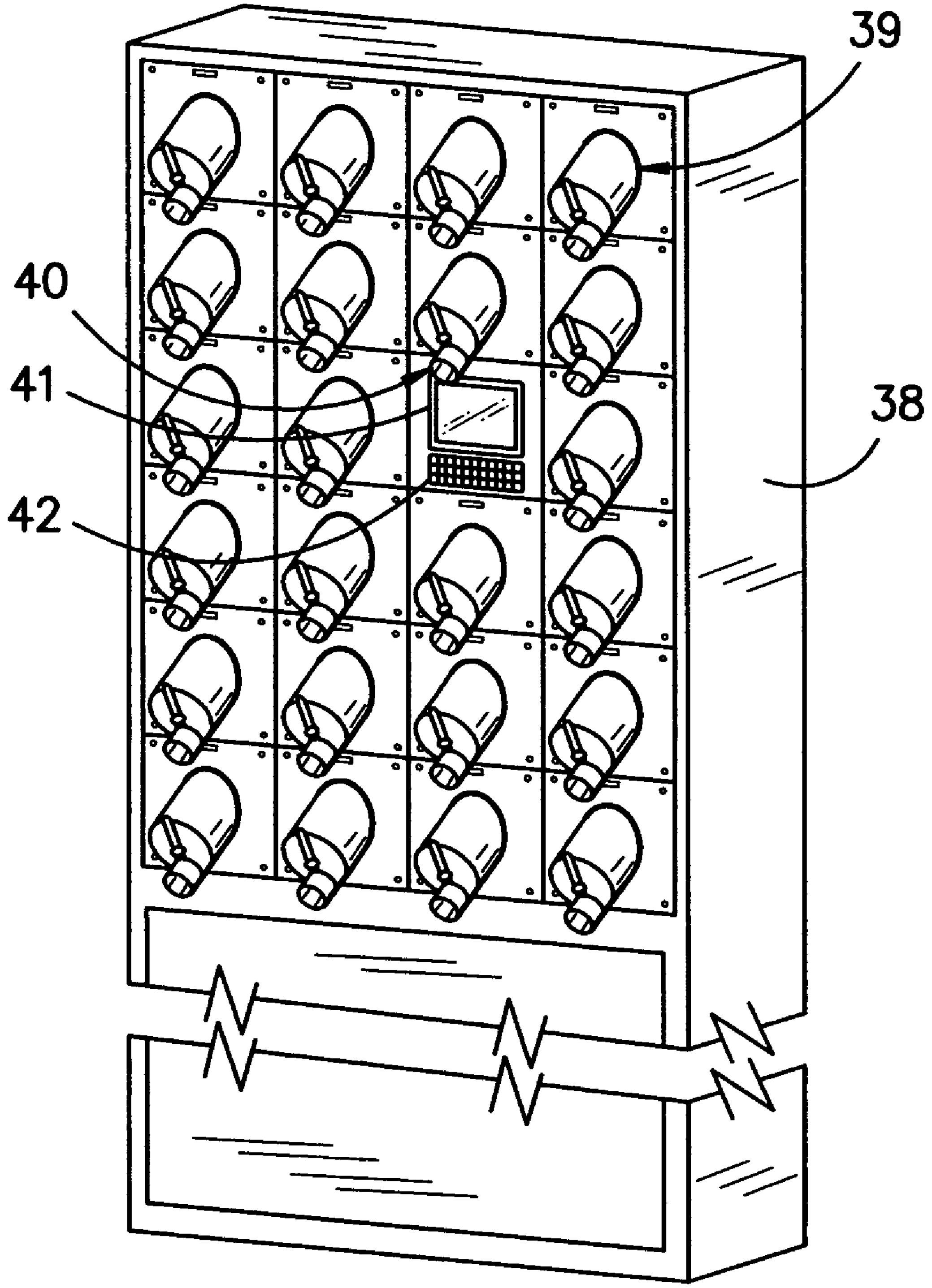
FIG. 9 is perspective view of an array of counting and dispensing apparatus.

FIG. 9 shows an array of counting and dispensing apparatus 38 arranged in cabinet 39. Operator interface 40 preferably comprises a touchscreen display 41, and may further comprise a barcode reader/scanner 42. In the embodiment shown, barcode reader/scanner 42 is fixed to cabinet 39 near operator interface 40, however it is contemplated that barcode reader/scanner 42 may be portable or handheld.

Figure 10:
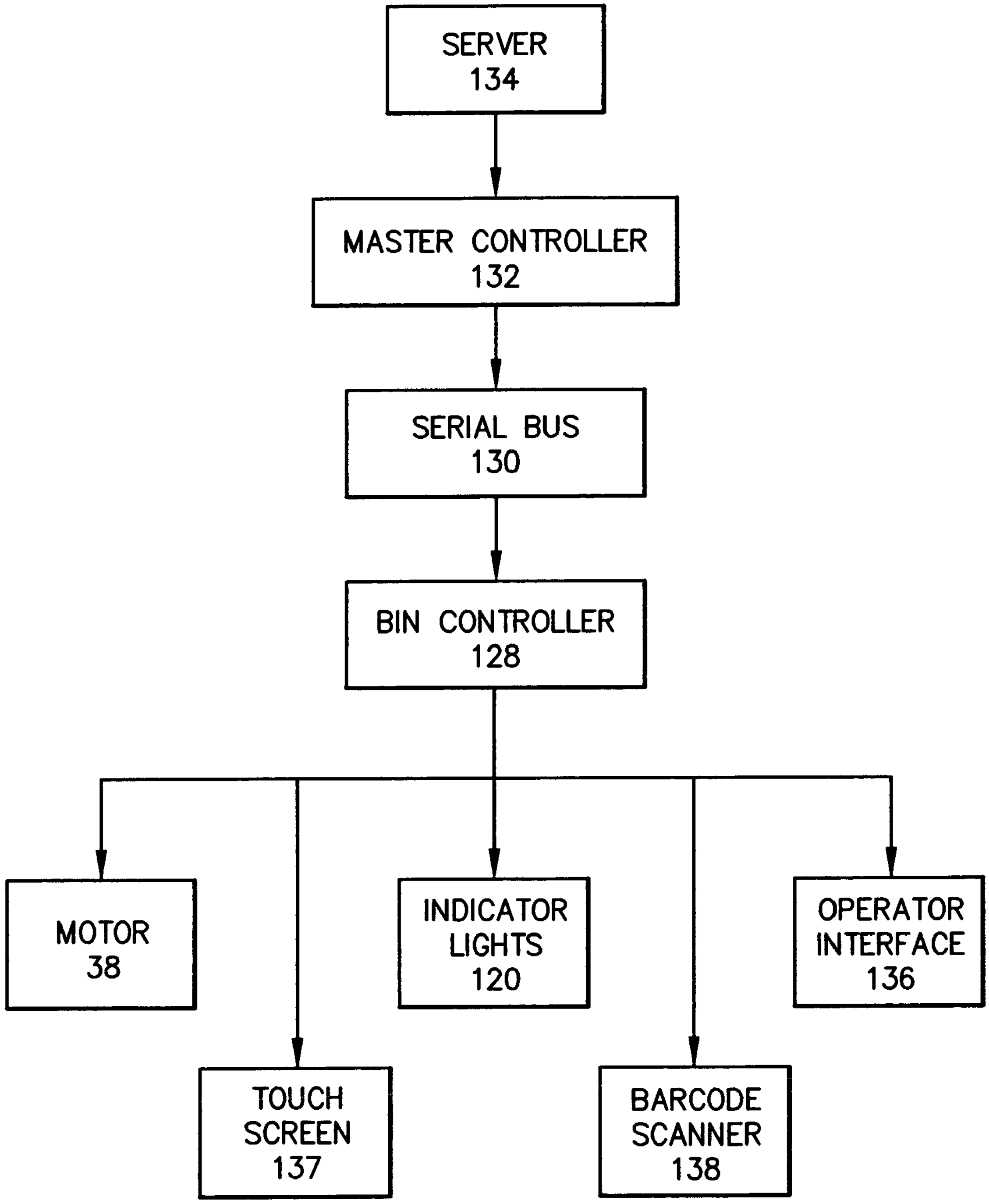
FIG. 10 is a schematic diagram illustrating the control system hierarchy of the automated system for pharmaceutical singulation, counting and dispensing constructed in accordance with the invention.
Figure 11:
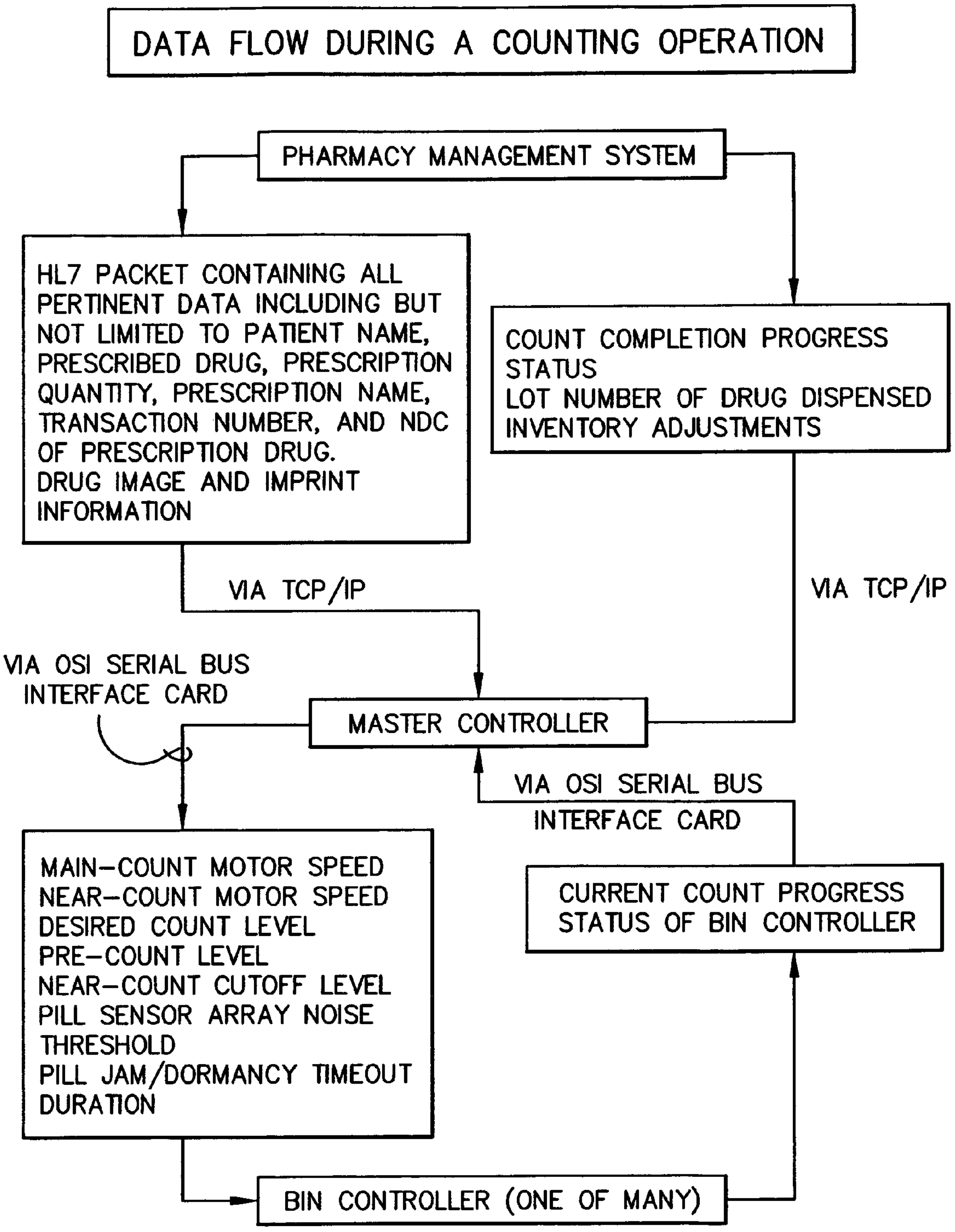
FIG. 11 is a schematic diagram illustrating the flow of data among the control system hierarchy of FIG. 10 of the automated system for pharmaceutical singulation, counting and dispensing constructed in accordance with the invention.

Referring to FIG. 10, the control system comprises a bin controller 128 with bin control software, a serial bus card 130, a master controller 132 with master control software, and a server 134. The control system may further comprise an operator interface 136.

Bin controller 128 preferably comprises a single board computer that controls all calculations required to control an individual pharmaceutical singulation, counting and dispensing unit as previously described. It is preferred that the main central processing unit of the bin controller 128 comprise at least a 50 MHz processor and at least 128 bytes of random access memory, and the co-processor comprise at least a 0.4 MHz processor and at least 16 bytes of random access memory.

Bin controller 128 emulates the function of several different microchips. For example, in a preferred embodiment the bin controller performs the functions of: a serial data transmission interface, a variable speed and direction motor controller, a real-time clock, and a microprocessor.

Bin controller 128 is also in communication with a variety of sensors for counting pharmaceutical units, for detecting a stoppage of the transport ring, for detecting pill dispensing via the receptacle, for detecting when an individual pharmaceutical singulation, counting and dispensing unit is opened for service, and for operating indicator lights to alert an operator.

Bin controller 128 controls the speed and direction of rotation of the transport ring. In a preferred embodiment the bin controller samples communications from the counting system about 300 times per second. The bin controller can detect when the counting system is dormant (i.e. not communicating pharmaceutical unit counts during a count cycle) and may further detect when the transport ring is jammed. Typically the two conditions are related; the counting system is dormant because the transport ring is jammed and pharmaceutical units are not progressing to the counting system.

A serial bus card 130 permits many individual pharmaceutical singulation, counting and dispensing bins to connect to a single master device. Each individual pharmaceutical singulation, counting and dispensing bin is individually addressable. In a preferred embodiment the serial bus card 130 can support up to 127 individual pharmaceutical singulation, counting and dispensing bins.

A master controller 132 with master control software is in communication with the bin controllers 128 of individual pharmaceutical singulation, counting and dispensing bins via the serial bus card 130. The master controller 132 may utilize more than one serial bus card 130. Thus, the number of bins controlled by a single master controller is limited only by the master controller's expandability.

In a preferred embodiment the mater controller's software and operating system are entirely contained on at least a 256 MB compact flash card. To facilitate a master controller software upgrade, the operator may simply swap out the compact flash card.

Server 134 may be in communication with master controller 132. In a preferred embodiment server 134 is provided or maintained by a pharmacy management system provider and interfaces the master controller 132 with the pharmacy management system provided.

Operation of the Counting and Dispensing System

A summary of the operation of the automated system for pharmaceutical singulation, counting and dispensing will now be described.

Referring to FIG. 10, a prescription is filled via a pharmacy management system, such as those provided by QS/1 Data Systems, Inc., of Spartanburg, S.C. Prescription data is sent from the pharmacy management system service provider's server 134 to the master controller 132 preferably via a TCP/IP interface. Master controller 132 designates an individual pharmaceutical singulation, counting and dispensing bin containing the pharmaceutical unit required to fill the prescription. Master controller 132 communicates to the selected bin controller 128 via serial bus card 130 the prescription data.

The prescription data may include, but is not limited to, a transaction number, the patient's name, the name of the pharmaceutical unit to be filled, the quantity of said pharmaceutical unit to be filled, the prescriber's name, an NDC of the prescribed pharmaceutical unit, a picture or photograph of the pharmaceutical unit to be filled, the main count cycle motor speed, the near count cycle motor speed, the desired count level, the pre-count level, the near count cutoff level, the counting system noise threshold, and/or the pharmaceutical unit jam/counting system dormancy timeout duration.

The selected individual pharmaceutical singulation, counting and dispensing bin initiates a count cycle to singulate, count and dispense the exact quantity and type of pharmaceutical units required by the prescription data.

Upon receiving a command to initiate a count cycle bin controller 128 activated the motor, which rotates the transport ring. Bulk pharmaceutical units are transported along a top portion of the transport ring, from the hopper to the discharge outlet and counting system. The counting system counts the discharged pharmaceutical units.

As the discharged pharmaceutical unit count nears the count total and reaches the determined slow count point, bin controller 128 slows down the motor and the transport ring, to slow down the system for the last few pills in a count cycle. This near count slow down is adjustable as to the near count speed at which the transport ring is driven. Discharged counted pharmaceutical units are collected in the receptacle for dispensing into a properly labeled and authenticated dispensing bottle.

Upon detecting a dormant count or jam, the bin controller will attempt to self clear. In a preferred embodiment the bin controller 128 will stop the motor and the transport ring, reverse the direction of the motor and the transport ring, for an adjustably selective period, then stop motor and the transport ring, and resume forward direction of the motor and the transport ring in an attempt to self clear. Preferably the bin controller will attempt to self clear in this manner at least three times prior to stopping the transport ring and activating an indicator light, to alert an operator that an error has occurred.

Prior to, during, or after the count cycle an operator labels a pharmaceutical unit dispensing bottle that is configured with a barcode. Once the count cycle is complete and the operator is ready to load the pharmaceutical unit dispensing bottle, the operator scans the barcode on the prescription label affixed to the bottle. Master controller 132 receives and decodes the data contained in the barcode. Particularly, master controller 132 matches the bottle barcode data to the prescription data previously received. Master controller 132 activates indicator lights, which alert the operator to the correct pharmaceutical unit singulation, counting and dispensing bin from which to load the bottle via indicator lights. Having identified the correct pharmaceutical unit singulation, counting and dispensing bin via the indicator lights, the operator positions the bottle at the receptacle, which collects the counted pharmaceutical units While a preferred embodiment of the invention has been described using specific terms, such description is for illustrative purposes only, and it is to be understood that changes and variations may be made to the automated system for pharmaceutical singulation, counting and dispensing, whereby a bulk of stored pharmaceutical units are singulated into a single file line for counting and dispensing, its parts, and methods of manufacture, without departing from the spirit or scope of the following claims.

What we claim is:

1. An apparatus for counting pharmaceutical units, comprising:

(a) a deck assembly;

(b) a cylindrical chamber carried by the deck assembly;

(c) a hopper, carried by the deck assembly and positioned within the cylindrical chamber, the hopper having (i) side walls, (ii) a floor, positioned within the side walls and tilted relative to horizontal, whereby the floor is free to move relative to the side walls, and (iii) an opening adjacent a lower side of the floor, from which to discharge the pharmaceutical units;

(d) a means to pivot the floor of the hopper around a central axis;

(e) a means to support the floor of the hopper in a tilted orientation, while allowing the hopper to pivot around the central axis;

(f) a means to vibrate the floor of the hopper, whereby the floor of the hopper rides unevenly against a surface as the floor is pivoted;

(g) a rotatable, transport ring carried by the deck assembly, the transport ring having an inner perimeter, an outer perimeter and a top surface, wherein the outer perimeter of the transport ring is positioned within the walls of the cylindrical chamber, and wherein the opening in the hopper is oriented to discharge the pharmaceuticals units onto the top surface of the transport ring;

(h) a motor for rotating the transport ring;

(i) an outlet in the cylindrical chamber for discharging the pharmaceutical units from the transport ring;

(j) a receptacle for receiving the pharmaceutical units discharged through the outlet;

(k) a counting system, for counting the pharmaceutical units discharged to the receptacle; and (l) a controller for receiving prescription data, initiating a count cycle, controlling the transport ring motor, receiving a pharmaceutical unit count from the counting system and ending a count cycle.

2. The apparatus of claim 1 wherein the means to vibrate the floor of the hopper comprises a wheel positioned to ride across a ridged surface.

3. The apparatus of claim 2 wherein the wheel is attached to the bottom of the hopper and the ridged surface is affixed to the deck assembly.

4. The apparatus of claim 1 wherein the transport ring is slanted downward from its inner perimeter to an outer perimeter, and the outer perimeter of the transport ring and the walls of the cylindrical chamber are positioned to cause the pharmaceutical units to contact the walls of the cylindrical chamber as the pharmaceutical units are being transported.

5. The apparatus of claim 4 wherein the cylindrical chamber has an undulated surface, relative to the transport ring.

6. The apparatus of claim 4 wherein the transport ring is slanted downward at an angle of from 15 to 55° relative to the horizontal.

7. The apparatus of claim 6, wherein the undulated surface of the cylindrical chamber is characterized by a frequency from ⅛ inch to 1 ½ inches and amplitudes of from 5 mils to 200 mils.

8. The apparatus of claim 4 wherein the transport ring is slanted downward at an angle of from 25 to 45° relative to the horizontal.

9. The apparatus of claim 8, wherein the undulated surface of the cylindrical chamber is characterized by crests of from ¼ inch to ¾ inch and amplitudes of from 20 mils to 100 mils.

10. The apparatus of claim 1 wherein the floor of the hopper is tilted at an angle of from 8 to 20° relative to the horizontal.

11. The apparatus of claim 10, wherein the hopper further comprises a means to dislodge stacked pharmaceutical units exiting the opening, the dislodging means comprising a row of flexible fingers aligned across the opening, and wherein the height of the fingers above the floor of the hopper is adjustable to accommodate pharmaceutical units of varying size and shape.

12. The apparatus of claim 11, wherein the dislodging means further comprises an array of flexible fingers aligned across the opening of the hopper and extending backwards from the opening to a thickness of at least ½ inch, and wherein the bottom of the array forms an angle which is greater than the angle of tilt of the floor of the hopper, such that the fingers closer to the opening extend downward a greater distance than the fingers farther from the opening.

13. The apparatus of claim 12, wherein the bottom of the array of fingers are at an angle of 25 to 40° relative to the horizontal.

14. An apparatus for counting pharmaceutical units, comprising:

(a) a deck assembly;

(b) a cylindrical chamber carried by the deck assembly, wherein the cylindrical chamber has an undulated inner surface;

(c) a hopper, carried by the deck assembly and positioned within the cylindrical chamber, the hopper having (i) side walls, (ii) a floor, positioned within the side walls and tilted relative to horizontal, and (iii) an opening adjacent a lower side of the floor, from which to discharge the pharmaceutical units;

(d) a means to urge the pharmaceutical units towards the opening in the hopper;

(e) a rotatable, transport ring carried by the deck assembly, the transport ring having an inner perimeter, an outer perimeter and a top surface, wherein the outer perimeter of the transport ring is positioned within the walls of the cylindrical chamber, and wherein the opening in the hopper is oriented to discharge the pharmaceuticals units onto the top surface of the transport ring, and wherein the transport ring is slanted downward from its inner perimeter to an outer perimeter, and the outer perimeter of the transport ring and the cylindrical chamber are positioned to cause the pharmaceutical units to contact the undulated inner surface of the cylindrical chamber as the pharmaceutical units are being transported;

(f) a motor for rotating the transport ring;

(g) an outlet in the cylindrical chamber for discharging the pharmaceutical units from the transport ring;

(h) a receptacle for receiving the pharmaceutical units discharged through the outlet;

(i) a counting system, for counting the pharmaceutical units discharged to the receptacle; and (j) a controller for receiving prescription data, initiating a count cycle, controlling the transport ring motor, receiving a pharmaceutical unit count from the counting system and ending a count cycle.

15. The apparatus of claim 14 wherein the transport ring is slanted downward at an angle of from 15 to 55° relative to the horizontal.

16. The apparatus of claim 15, wherein the undulated surface of the cylindrical chamber is characterized by a frequency from ⅛ inch to 1½ inches and amplitudes of from 5 mils to 200 mils.

17. The apparatus of claim 14 wherein the transport ring is slanted downward at an angle of from 25 to 45° relative to the horizontal.

18. The apparatus of claim 17, wherein the undulated surface of the cylindrical chamber is characterized by crests of from ¼ inch to ¾ inch and amplitudes of from 20 mils to 100 mils.

19. The apparatus of claim 14 wherein the floor of the hopper is tilted at an angle of from 8 to 20° relative to the horizontal.

20. The apparatus of claim 14 wherein the means to urge the pharmaceutical units towards the opening in the hopper is a means to pivot and vibrate the floor of the hopper relative to the side walls of the hopper, wherein the transport ring is slanted downward at an angle of from 15 to 55° relative to the horizontal, and wherein the undulated surface of the cylindrical chamber is characterized by crests of from ¼ inch to ¾ inch and amplitudes of from 20 mils to 100 mils.

* * * * *